G. PHILIPPART.
DOUBLE-TOP.
APPLICATION FILED JUNE 22, 1906.
901,037.
Patented Oct. 13, 1908.
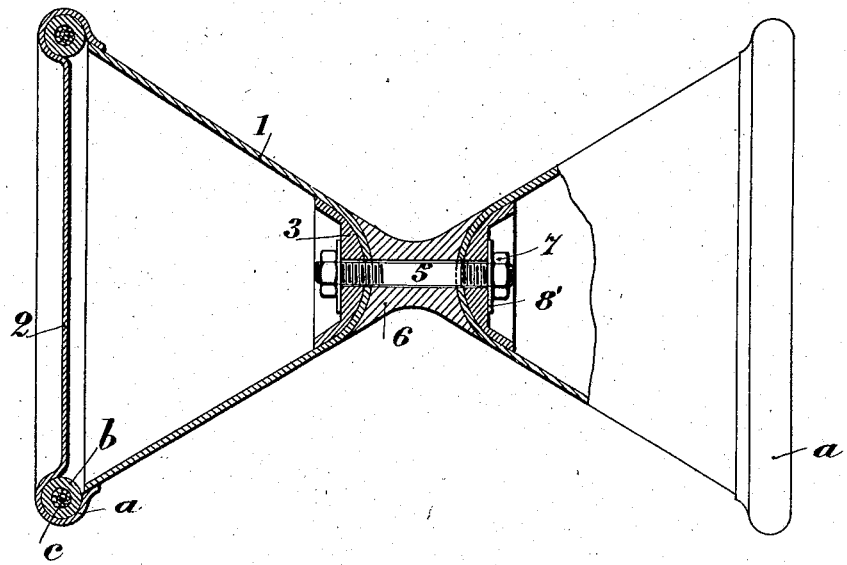
Witnesses
Inventor
Gustave Philippart
By
Attorney

# UNITED STATES PATENT OFFICE.

GUSTAVE PHILIPPART, OF PARIS, FRANCE.

DOUBLE TOP.

No. 901,037.

Specification of Letters Patent.

Patented Oct. 13, 1908.

Application filed June 22, 1906. Serial No. 322,803.

*To all whom it may concern:*

Be it known that I, GUSTAVE PHILIPPART, subject of the King of Belgium, residing at 8 Rue Mayran, Paris, in the Republic of France, have invented new and useful Improvements in Double Tops, of which the following is a specification.

The present invention relates to double headed spinning tops, particularly to that kind of tops known under the name of "Diable".

Expressed in general terms, the invention includes two cone shaped members with means for firmly securing the same together, and the object of the invention is to improve the detailed construction of tops of this character, the novel features of the invention being fully hereinafter explained and particularly defined in the claim appended at the foot hereof.

The invention is illustrated in detail in the accompanying drawing, wherein the figure represents a longitudinal sectional view, partly in elevation, of the invention.

As illustrated in the drawing the invention embodies a pair of cone shaped members 1, which are preferably hollow and may be made of any suitable material, such as celluloid, pulped leather, compressed paste board, hardened rubber or metal, each cone member 1 being closed at the base by a suitable cap 2, made of material similar to that of which the cones 1 are made.

The form of cap illustrated, includes a flat plate or disk, having a convolute edge *a* which is adapted to be closed over, and suitably secured to, the wall of the cone member 1. Within the annular space formed by the convolute edge *a* I preferably place a hollow ring *b* of india rubber or the like, and reinforce the same by means of an embedded core *c*.

A completed top comprises two cone members having their apices directed toward each other and joined by a suitable connecting member. Each apex is rounded and is designed to snugly fit into a correspondingly formed socket provided upon the connecting member 6, the latter being preferably solid, except at its central portion wherein a bore is formed through which passes securing means, such as a bolt 5, for securing the cone members and central connecting member rigidly together.

Seated within the apex of each cone member 1 is a substantially cup shaped washer or gasket 3 presenting a flat face against which is adapted to bear a metallic washer 8' lying under a nut 7 threaded upon the end of the bolt 5. It will be understood that the bolt 5 is screw threaded at both ends and by tightening the nuts 7 against the metallic washers 8' the cone members 1 are tightly drawn together and securely held in their respective sockets. By providing the gaskets 3, which are made of a somewhat yielding material, a very tight joint between the several members is effected, and the liability of the parts to become loosened is reduced to a minimum.

Having thus described my invention, what I claim as new and desire to secure by Letters Patent is:—

In a double headed spinning top of the character described the combination with a pair of hollow cone members, of a central connecting member having ends designed to conform in shape to and embrace the apices of said cone members, a substantially cup shaped gasket arranged within the apex of each cone member, a through and through connection passing through a bore in the connecting member and having its ends projecting into the cone members, securing means placed on the ends of said connection and tightly seated against the said gaskets to draw the cone members firmly together, a cap for each cone member having a convolute edge adapted to be secured to the wall of the cone member, and an elastic ring held in the annular space formed by the said convolute edge.

In testimony whereof I have signed my name to this specification in the presence of two subscribing witnesses.

GUSTAVE PHILIPPART.

Witnesses:
LOUIS GARDET,
AUGUSTUS E. INGRAM.